(12) United States Patent
Chung et al.

(10) Patent No.: US 12,706,306 B2
(45) Date of Patent: Aug. 11, 2026

(54) CATHODE ACTIVE MATERIAL FOR LITHIUM SECONDARY BATTERY, METHOD FOR PREPARING THE SAME, AND METHOD FOR CONTROLLING MORPHOLOGY OF THE SAME

(71) Applicant: KOREA INSTITUTE OF SCIENCE AND TECHNOLOGY, Seoul (KR)

(72) Inventors: Kyung Yoon Chung, Seoul (KR); Mingony Kim, Seoul (KR); Eunbi Kim, Seoul (KR); Jae-Ho Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 601 days.

(21) Appl. No.: 18/189,820

(22) Filed: Mar. 24, 2023

(65) Prior Publication Data

US 2024/0105931 A1 Mar. 28, 2024

(30) Foreign Application Priority Data

Sep. 22, 2022 (KR) ........................ 10-2022-0120090

(51) Int. Cl.
*H01M 4/505* (2010.01)
*C01G 53/44* (2025.01)
(Continued)

(52) U.S. Cl.
CPC ............ *H01M 4/505* (2013.01); *C01G 53/44* (2013.01); *H01B 1/08* (2013.01); *H01M 4/525* (2013.01);
(Continued)

(58) Field of Classification Search
CPC ........... H01B 1/00; H01B 1/08; H01M 4/043; H01M 4/505; C01G 53/44
See application file for complete search history.

(56) References Cited

U.S. PATENT DOCUMENTS 7,097,938 B2 * 8/2006 Yamada .................. H01M 4/46 429/220
9,029,022 B2 * 5/2015 Miyagi ................. H01M 4/587 429/188
(Continued)

FOREIGN PATENT DOCUMENTS

CN 102120610 A * 7/2011
CN 107331849 A * 11/2017
(Continued)

OTHER PUBLICATIONS

Hamad et al."Stabilizing Li-rich NMC Materials by Using Precursor Salts with Acetate and Nitrate Anions for Li-ion Batteries", Batteries 2019, 5, 69; doi:10.3390/batteries5040069.*
(Continued)

*Primary Examiner* — Mark Kopec

(57) ABSTRACT

Provided is a method for preparing a cathode active material for a lithium secondary battery, and more particularly, the method includes mixing lithium nitrate, nickel nitrate, cobalt nitrate, and manganese nitrate with a solvent to form a mixture, performing first annealing on the mixture to form an NCM precursor including the lithium nitrate and transition metal oxide (NiCoMnO), compressing the NCM precursor to remove voids, and performing second annealing on the NCM precursor to form NCM particles.

10 Claims, 13 Drawing Sheets

Example 1

Example 2

(51) Int. Cl.
*H01B 1/08* (2006.01)
*H01M 4/525* (2010.01)
*H01M 4/02* (2006.01)

(52) U.S. Cl.
CPC ...... *C01P 2002/50* (2013.01); *C01P 2002/72* (2013.01); *C01P 2002/74* (2013.01); *C01P 2002/88* (2013.01); *C01P 2004/03* (2013.01); *C01P 2004/61* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 9,184,443 | B2 | 11/2015 | Lee et al. | |
| 12,148,920 | B2 * | 11/2024 | Hu | H01M 4/525 |
| 2022/0209231 | A1 | 6/2022 | Kwak | |

FOREIGN PATENT DOCUMENTS

| | | | |
|---|---|---|---|
| JP | 2013-249225 | A | 12/2013 |
| KR | 10-2006-0029048 | A | 4/2006 |
| KR | 10-2015-0006283 | A | 1/2015 |
| KR | 10-2021-0090567 | A | 7/2021 |
| KR | 10-2022-0039638 | A | 3/2022 |
| KR | 10-2022-0041032 | A | 3/2022 |

OTHER PUBLICATIONS

Mai Thanh Tung et al., "Electrochemical properties of LiNi0.8Co0.1Mn0.1O2 synthesized by sol-gel and co-precipitation methods," Vietnam Journal of Chemistry, International Edition, Dec. 19, 2016, pp. 724-729, vol. 54(6)

* cited by examiner

FIG. 3A

MXT

TMNT

LNT

MXU

SOL

:Mixture of TMx(NO3)y
:NiO
:LiNO3
:LinixCoyMn1-x-yO2
500℃
260℃
30℃
10
15
20
25
30
35
40
45
50
55
60
65
70
75
80
2θ/°(λ=1.54Å)

Example 1

Example 2

Voltage (V vs. Li/Li+)
4.4
4.2
4.0
3.8
3.6
3.4
3.2
3.0
2.8
2.6
0
50
100
150
200
Capacity (mAh g-1)
Example 1
Example 2

Discharge Capacity (mAh g-1)
200
180
160
140
120
100
80
60
40
20
0
171 mAh g-1
162 mAh g-1
Example 1: 80.0%, 200th cycle
Example 2: 73.5%, 200th cycle
0
50
100
150
200
Cycle Number

CATHODE ACTIVE MATERIAL FOR LITHIUM SECONDARY BATTERY, METHOD FOR PREPARING THE SAME, AND METHOD FOR CONTROLLING MORPHOLOGY OF THE SAME

CROSS-REFERENCE TO RELATED APPLICATIONS

This U.S. non-provisional patent application claims priority under 35 U.S.C. § 119 of Korean Patent Application No. 10-2022-0120090, filed on Sep. 22, 2022, the entire contents of which are hereby incorporated by reference.

BACKGROUND

The present disclosure herein relates to a cathode active material for a lithium secondary battery, a method for preparing the same, and a method for controlling the morphology of the same.

Batteries, which generate electric energy through physical or chemical reactions of materials to supply power to the outside, are used when alternating current (AC) power supply for buildings is not available, or when direct current (DC) power is required, depending on the living environment surrounded by various electrical/electronic devices.

Among such batteries, primary batteries and secondary batteries, which are chemical cells using chemical reactions, are generally used. The primary batteries are consumable batteries which are collectively referred to as dry batteries. On the other hand, the secondary batteries are rechargeable batteries in which oxidation and reduction processes are repeatable at cathode and anode. When a reduction reaction takes place on a cathode through current, power is charged; and when an oxidation reaction takes place on a cathode, power is discharged. In the secondary batteries, such charging and discharging are repeated.

In lithium secondary batteries, a cathode active material formed of a lithium composite oxide containing a high amount of nickel is gaining attention. The cathode active material has a high energy density, but the high amount of nickel causes a sharp decline in battery lifespan and stability. One of the reasons for the decline of lifespan involves the shape and structure of a lithium composite oxide.

A cathode active material of a lithium composite oxide is generally prepared using a co-precipitation method. Specifically, a mixed transition metal hydroxide such as nickel manganese cobalt hydroxide is prepared and the prepared mixed transition metal hydroxide is mixed with a lithium raw material and fired to prepare a cathode active material. However, the method for preparing a cathode active material using a co-precipitation method is complicated and not economical.

SUMMARY

The present disclosure provides a cathode active material for a lithium secondary battery having high energy density and excellent durability.

The present disclosure also provides a method for preparing a cathode active material for a lithium secondary battery.

The present disclosure also provides a method for controlling the morphology of a cathode active material for a secondary battery.

An embodiment of the inventive concept provides a method for preparing a cathode active material for a lithium secondary battery, the method including mixing lithium nitrate, nickel nitrate, cobalt nitrate, and manganese nitrate with a solvent to form a mixture, performing a first heat treatment on the mixture to form an NCM precursor, the NCM precursor including the lithium nitrate and transition metal oxide (NiCoMnO), compressing the NCM precursor to remove voids, and performing a second heat treatment on the NCM precursor to form NCM particles.

In an embodiment, the NCM particles may include lithium composite oxide (LiNiCoMnO), the first heat treatment may be performed at about 350° C. to about 600° C., and the second heat treatment may be performed at about 570° C. to about 900° C.

In an embodiment of the inventive concept, a cathode active material for a lithium secondary battery includes NCM particles which are lithium composite oxide (LiNiCoMnO). The NCM particles are poly-crystalline or single-crystalline, and an intensity ratio of (003) to (004) according to XRD analysis is about 1.3 to about 2.0.

In an embodiment of the inventive concept, a method for controlling the morphology of a cathode active material for a lithium secondary battery includes mixing lithium nitrate, nickel nitrate, cobalt nitrate, and manganese nitrate with a solvent to form a mixture, performing a first heat treatment on the mixture to form an NCM precursor, the NCM precursor including the lithium nitrate and transition metal oxide (NiCoMnO), compressing the NCM precursor to remove voids, and performing a second heat treatment on the NCM precursor to form NCM particles. The NCM particles include lithium composite oxide (LiNiCoMnO), the first heat treatment is performed at about 350° C. to about 600° C., and the second heat treatment is performed at about 570° C. to about 900° C. wherein the temperature of the second heat treatment is regulated to control the morphology and crystallinity of the NCM particles.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 3A, 3B, 3C, and 3D are schematic views for describing a process of preparing NCM particles according to embodiments of the inventive concept;

DETAILED DESCRIPTION

Figure 1:
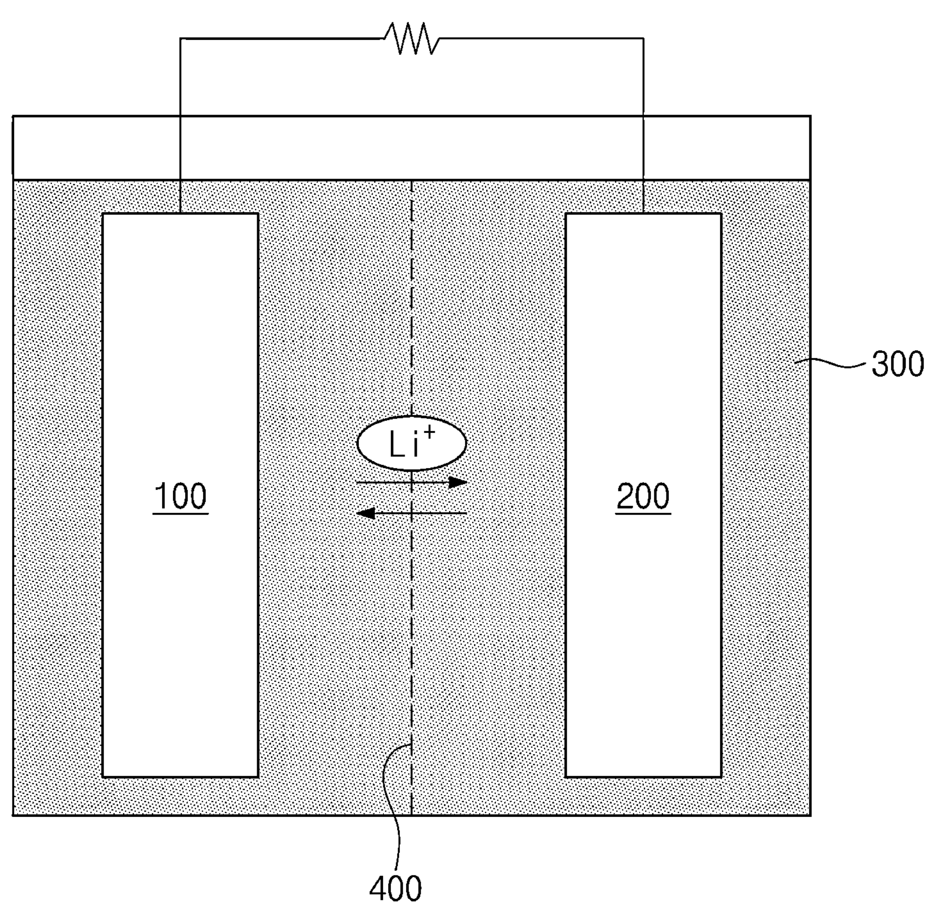
FIG. 1 is a conceptual view briefly showing a lithium secondary battery according to embodiments of the inventive concept.

Preferred embodiments of the present disclosure will be described with reference to the accompanying drawings so as to sufficiently understand constitutions and effects of the inventive concept. However, the present disclosure may be embodied in different forms with various changes, but not limited to the embodiments set forth herein. Rather, these embodiments are provided so that this disclosure will be thorough and complete, and will fully convey the scope of the present disclosure to a person skilled in the art to which the invention pertains.

In this specification, it will be understood that when a component is referred to as being 'on' another component, it may be directly on another component, or an intervening third component may also be present. Also, in the drawings, the thicknesses of the components are exaggerated for effectively describing the technical features. Like reference numerals refer to like elements throughout.

The embodiments described in this description will be explained with reference to the cross-sectional views and/or plan views as ideal example views of the present disclosure. In the drawing, the thicknesses of films and regions are exaggerated for effective description of the technical contents. Thus, areas exemplified in the drawings have general properties, and shapes of the exemplified areas are used to illustrate a specific shape of a device region. Therefore, this should not be construed as limited to the scope of the present disclosure. Although terms like a first, a second, and a third are used to describe various components in various embodiments of this specification, the components should not be limited to these terms. These terms are used only to distinguish one component from another component. Embodiments described and exemplified herein include complementary embodiments thereof.

Terms used herein are not for limiting the inventive concept but for describing the embodiments. In this specification, the singular forms include the plural forms as well, unless the context clearly indicates otherwise. The meaning of "comprises" and/or "comprising" used in the specification does not exclude the presence or addition of one or more other components besides a mentioned component.

FIG. 1 is a conceptual view briefly showing a lithium secondary battery according to embodiments of the inventive concept. Referring to FIG. 1, a lithium secondary battery may include an anode 100, a cathode 200, an electrolyte 300, and a separator 400.

The anode 100 and the cathode 200 may be spaced apart with the separator 400 therebetween. The anode and the cathode 200 may be disposed to face each other with the separator 400 therebetween. The anode 100, the cathode 200, and the separator 400 may contact the electrolyte 300.

The electrolyte 300 may be a medium for transporting lithium ions between the anode 100 and the cathode 200. In the electrolyte 300, the lithium ions may pass through the separator 400 and move toward the anode 100 or the cathode 200.

The cathode 200 may include a cathode active material, which is a source of lithium ions. The cathode active material according to an embodiment of the inventive concept may include lithium composite oxide (LiNiCoMnO) particles containing a high amount of nickel. More specifically, in the particles according to an embodiment of the inventive concept, a proportion of Ni atoms among transition metal atoms formed of Ni, Co, and Mn may be about 85 at % to about 95 at %. Hereinafter, in an embodiment of the inventive concept, the particles are indicated as NCM particles.

As the NCM particles of an embodiment of the inventive concept have a high amount of Ni, battery capacity may be improved. The NCM particles of an embodiment of the inventive concept may increase energy density of batteries to be economical.

In general, when the amount of Ni is greater in a ternary cathode material formed of Ni, Co, and Mn, the cathode material may have lower structural stability and cation mixing takes place. Crystallized NCM particles may be used to overcome the limitation. However, a co-precipitation method used to prepare the crystallized NCM particles causes a sharp rise in production costs of the cathode material.

In an embodiment of the inventive concept, the crystallized NCM particles may be economically prepared using a one-pot solid-state synthetic route to prevent the limitation. As the NCM particles of an embodiment of the inventive concept have a high amount of Ni, battery capacity may be improved. In addition, the NCM particles of an embodiment of the inventive concept have high structural stability and cation mixing does not take place. In an embodiment of the inventive concept, the morphology and crystallinity (single-crystal or poly-crystal) of NCM particles may be controlled through changes in crystallization temperature.

The cathode 200 including the cathode active material according to embodiments of the inventive concept will be described in more detail. The cathode 200 may include a cathode collector and a cathode active material layer on the cathode collector. The cathode active material layer may include the cathode active material of an embodiment of the inventive concept, that is, NCM particles, which will be described later.

The cathode collector may include materials having conductivity without causing chemical changes in batteries. For example, the cathode collector may include stainless steel, aluminum, nickel, titanium, or fired carbon.

The cathode collector may have a thickness of about 3 μm to about 500 μm. The cathode collector may have a surface having irregularities, and may thus increase adhesion of the cathode active material. The cathode collector may be used in various forms such as a film, a sheet, a foil, a net, a porous body, a foam body, or a non-woven fabric body.

The cathode active material layer may further include a conductive material and a binder, in addition to the cathode active material according to an embodiment of the inventive concept. The cathode active material may be included in an amount of about 80 wt % to about 99 wt %, more specifically about 85 wt % to about 98 wt %, with respect to a total weight of the cathode active material layer.

The conductive material may provide conductivity to the cathode active material layer. The conductive material may include at least one of a carbon-based material (e.g., graphite, carbon black, acetylene black, Ketjen black, channel black, furnace black, lamp black, thermal black, or carbon fiber), metal powder, metal fiber, conductive whisker, conductive metal oxide, conductive polymer, and a combination thereof. The conductive material may be included in an amount of about 1 wt % to about 30 wt % with respect to a total weight of the cathode active material layer.

The binder may improve adhesion between NCM particles which will be described later, and between NCM particles and a collector. For example, the binder may include at least one of polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, and a combination thereof. The binder may be included in an amount of about 1 wt % to about 30 wt % with respect to a total weight of the cathode active material layer.

The cathode may be prepared according to a typical method of preparing a cathode, except that the cathode active material of an embodiment of the inventive concept is used as the cathode 200. Specifically, the cathode active material, the binder, and the conductive material of an embodiment of the inventive concept may be dissolved or dispersed in a solvent to prepare a mixture. The mixture may be applied onto the cathode collector, and then dried and roll-pressed to prepare the cathode 200.

The solvent may be a solvent commonly used in the art, and may include, for example, at least one of dimethyl sulfoxide (DMSO), isopropyl alcohol, N-methylpyrrolidone (NMP), acetone, water, or a combination thereof.

In another embodiment, the mixture may be cast on a separate support to prepare a film. The film may be laminated on the cathode collector to prepare the cathode 200.

Figure 2:
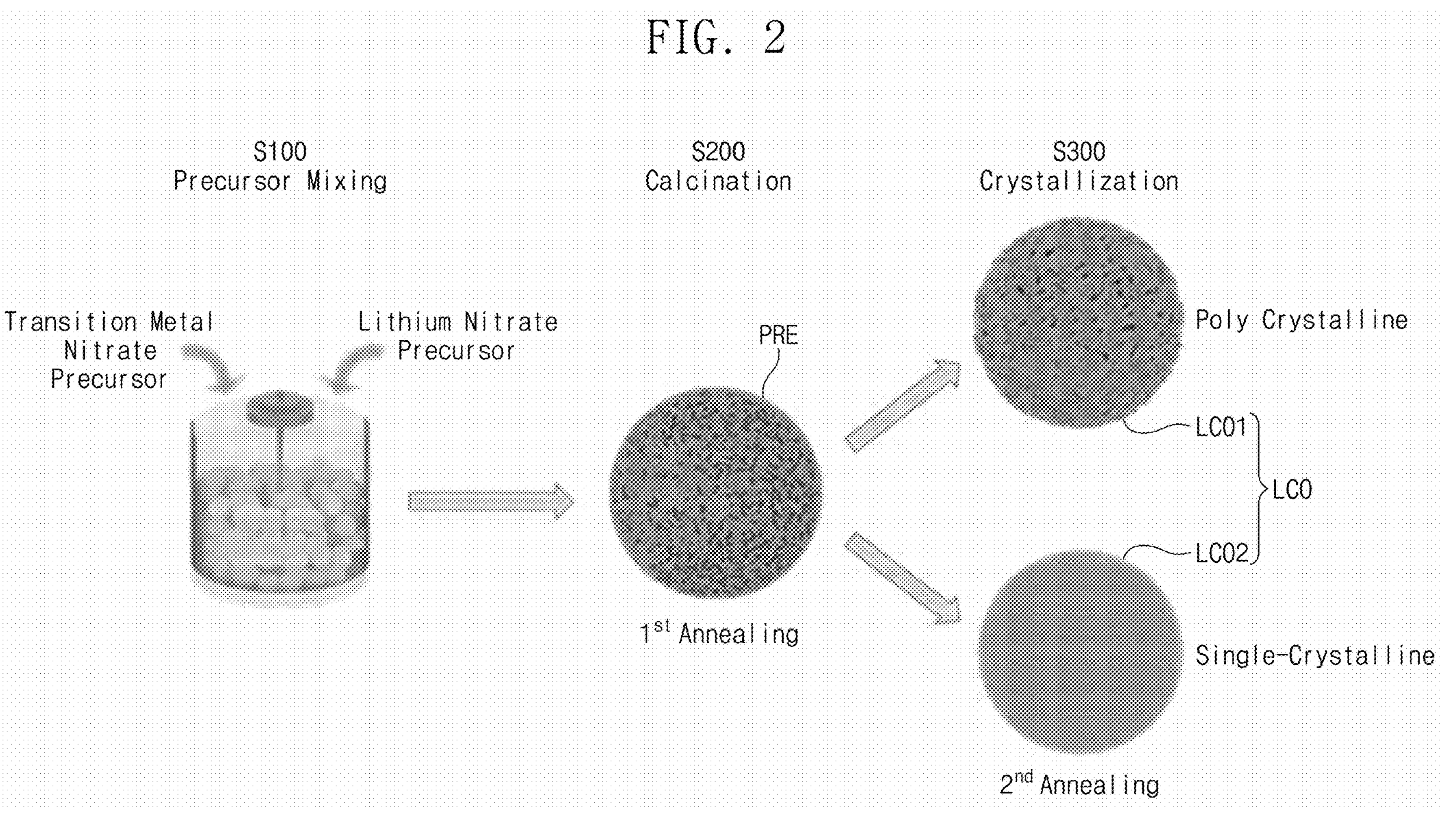
FIG. 2 is a conceptual view for schematically describing a one-pot solid-state synthetic route of NCM particles according to an embodiment of the inventive concept.

FIG. 2 is a conceptual view for schematically describing a one-pot solid-state synthetic route of NCM particles according to an embodiment of the inventive concept.

Referring to FIG. 2, the solid-state synthetic route of NCM particles according to an embodiment of the inventive concept may include mixing a lithium raw material and a transition metal raw material with a solvent (S100), performing a first heat treatment process on the mixture to form an NCM precursor PRE (S200), and performing a second heat treatment process on the NCM precursor PRE to form NCM particles LCO (S300).

The first heat treatment process (S200) may be a calcination process on the mixture, and the second heat treatment process (S300) may be a crystallization process on the NCM precursor PRE.

The solid-state synthetic route of NCM particles according to an embodiment of the inventive concept is divided into the first heat treatment process (S200) and the second heat treatment process (S300), which are provided with different temperatures, instead of a single heat treatment process.

The dividing of the route into the first heat treatment process (S200) and the second heat treatment process (S300) may prevent cations from co-existing in an active material, and may allow lithium (Li) to be bonded with another transition metal oxide (NiCoMnO) at an accurate position.

With the changes in temperature of the second heat treatment process (S300), the NCM particles LCO may be formed into first poly-crystalline NCM particles LCO1 or second single-crystalline NCM particles LCO2. The temperature of the second heat treatment process (S300) may be regulated to be about 570° C. to about 800° C. to form the first NCM particles LCO1. The temperature of the second heat treatment process (S300) may be regulated to be about 800° C. to about 900° C. to form the second NCM particles LCO2.

FIGS. 3A to 3D are schematic views for describing a process of preparing NCM particles according to embodiments of the inventive concept.

Figure 3A:
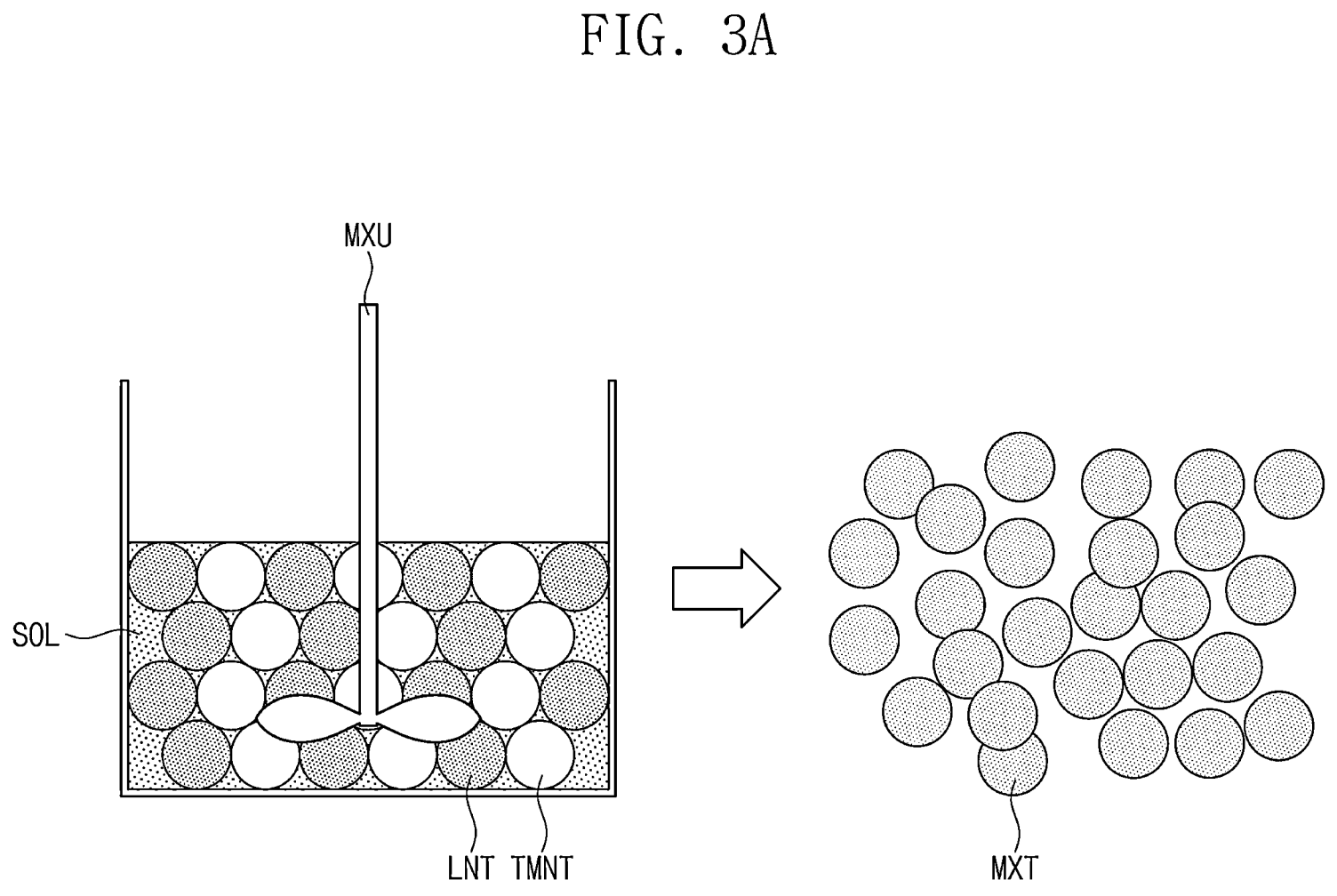

Referring to FIGS. 2 and 3A, a lithium raw material LNT and a transition metal raw material TMNT may be mixed with a solvent SOL (S100). Specifically, the lithium raw material LNT may be lithium nitrate. The transition metal raw material TMNT may include nickel nitrate, cobalt nitrate, and manganese nitrate.

The lithium raw material LNT and the transition metal raw material TMNT may be mixed at a molar ratio of about 1:1. Considering the loss of lithium upon the preparation process of the NCM particles, the lithium raw material LNT may be added in an amount slightly greater than an amount of the transition metal raw material TMNT.

The solvent SOL is an organic solvent and may include, for example, ketone. More specifically, the solvent SOL may include acetone. In an embodiment, the solvent SOL may be added in an amount of about 2 wt % to about 10 wt % with respect to a total weight of the lithium raw material LNT and the transition metal raw material TMNT. More specifically, the solvent SOL may be added in an amount of about 2 wt % to about 5 wt %.

In a mixing vessel, the mixture (LNT+TMNT) may be mixed through an agitator MXU. A drying process may be performed along with the mixing process. The drying process may be performed at a constant temperature of about 100° C. to about 200° C. Through the drying process, $H_2O$ in the mixture may be removed.

After the mixing and the drying, powder may be collected to obtain a mixture MXT. The mixture MXT may include lithium nitrate, nickel nitrate, cobalt nitrate, and manganese nitrate, which are uniformly mixed.

As the raw material of the mixing process (S100) according to an embodiment of the inventive concept, commercially easily available transition metal nitrate may be used. When a transition metal hydroxide is used as a raw material as Comparative Example of an embodiment of the inventive concept, a separate additional process for forming a transition metal hydroxide is required. However, according to an embodiment of the inventive concept, NCM particles may be directly prepared using transition metal nitrate without a separate additional process. This particular feature of an embodiment of the inventive concept has been referred to as a one-pot process.

In the mixing process (S100) according to an embodiment of the inventive concept, a ketone solvent in which the lithium raw material LNT and the transition metal raw material TMNT may well be dissolved or dispersed may be used. Accordingly, a mixture MXT in which the raw materials are uniformly well mixed even through a simple mixing method without a mixing instrument requiring high energy, such as a planetary mill, may be formed.

Figure 3B:
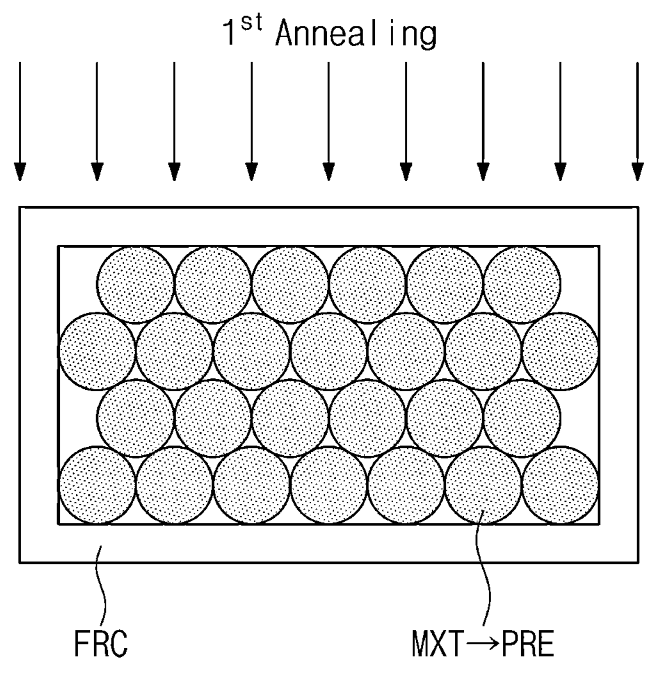

Referring to FIGS. 2 and 3B, the mixture MXT may be put into a furnace FRC and a first heat treatment process may be performed (S200). The first heat treatment process (S200) may be a calcination process on the mixture MXT.

The first heat treatment process (S200) may be performed at about 350° C. to about 600° C. More specifically, the first heat treatment process (S200) may be performed at about 480° C. to about 550° C. The first heat treatment process (S200) may be performed at a heating rate of about 3°

C./min to about 10° C./min. The first heat treatment process (S200) may be performed for about 6 hours to about 24 hours.

Through the first heat treatment process (S200), transition metal nitrate (NiCoMnNO) in the mixture MXT may be decomposed to form transition metal oxide (NiCoMnO). As the transition metal nitrate is decomposed, fine voids may be formed in the mixture MXT. Meanwhile, lithium nitrate is melted through the first heat treatment process (S200), but may remain in the form of nitric oxide, not in the form of oxide.

The NCM precursor PRE may be formed from the mixture MXT through the first heat treatment process (S200). The NCM precursor PRE may include lithium nitrate and transition metal oxide (NiCoMnO).

Figure 3C:
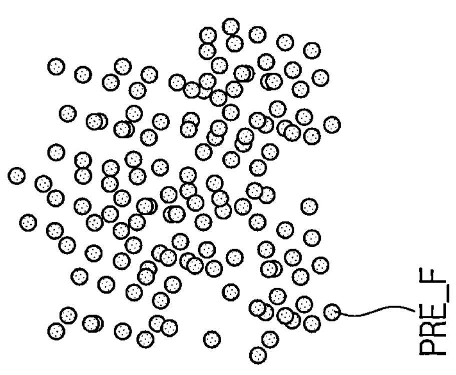
Figure 3C:
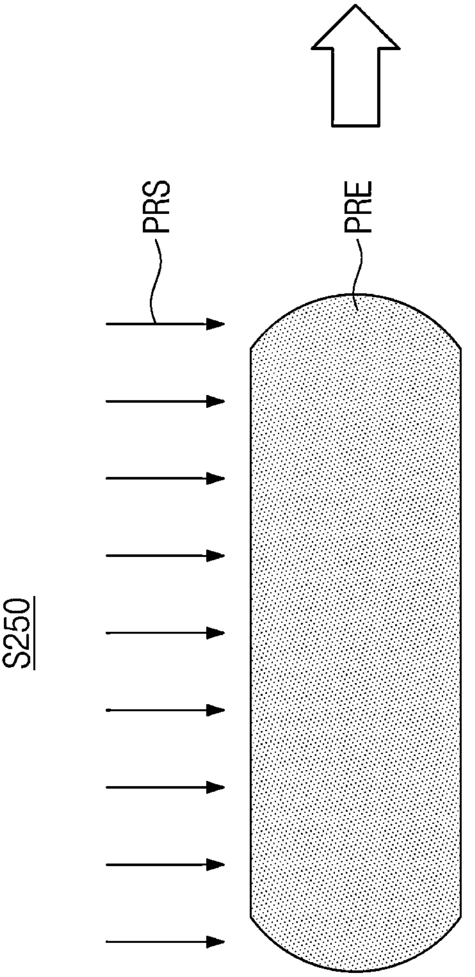

Referring to FIG. 3C, a pelletization process on the NCM precursor PRE may be performed (S250). Specifically, pressure PRS may be applied to the NCM precursor PRE to compress the NCM precursor PRE. The compressing of the NCM precursor PRE may reduce volume and remove voids generated through the first heat treatment process (S200).

The compressed NCM precursor PRE may be processed into a small particle size to form a NCM precursor PRE_F in the form of a pellet. As a result, the NCM precursor PRE_F may have no voids and have greater density.

Figure 3D:
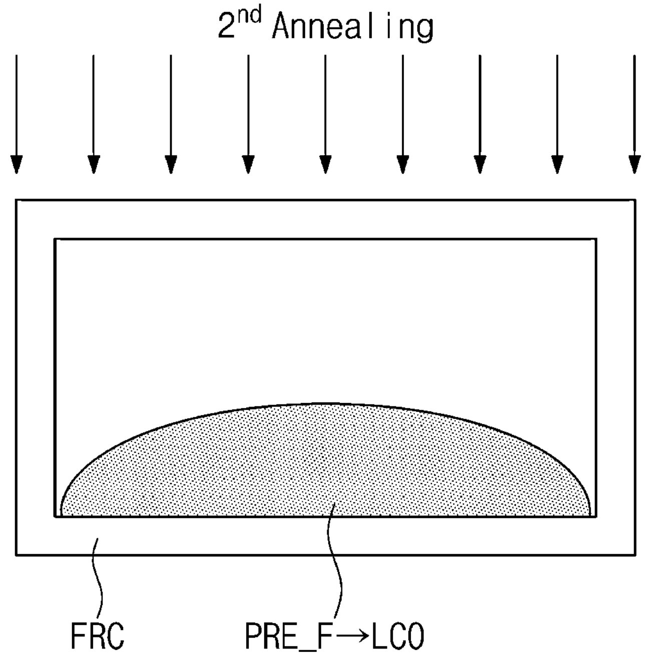

Referring to FIG. 3D, the NCM precursor PRE_F may be put back into the furnace FRC and a second heat treatment process may be performed (S300). The second heat treatment process (S300) may be a process of crystallizing the NCM precursor PRE_F.

The second heat treatment process (S300) may be performed at a higher temperature than the first heat treatment process (S200). The second heat treatment process (S300) may be performed at about 570° C. to about 900° C. The second heat treatment process (S300) may be performed at a heating rate of about 3° C./min to about 10° C./min. The second heat treatment process (S300) may be performed for about 6 hours to about 24 hours.

Lithium nitrate in the NCM precursor PRE_F is decomposed through the second heat treatment process (S300), and accordingly, lithium ions may be diffused into transition metal nitrate (NiCoMnNO). For example, diffusion of lithium ions starts at about 570° C., and lithium ions are bonded with transition metal nitrate (NiCoMnNO) to form lithium composite oxide (LiNiCoMnO).

NCM particles LCO may be formed from the NCM precursor PRE_F through the second heat treatment process (S300). The NCM particles LCO may include lithium composite oxide (LiNiCoMnO) having a uniform composition.

Depending on the temperature of the second heat treatment process (S300), the morphology and crystallinity of the NCM particles LCO may vary. For example, when the temperature of the second heat treatment process (S300) is regulated to be relatively low, poly-crystalline secondary particles in which primary particles are aggregated may be formed. When the temperature of the second heat treatment process (S300) is regulated to be relatively high, single-crystalline primary particles may be formed.

Figure 6A:
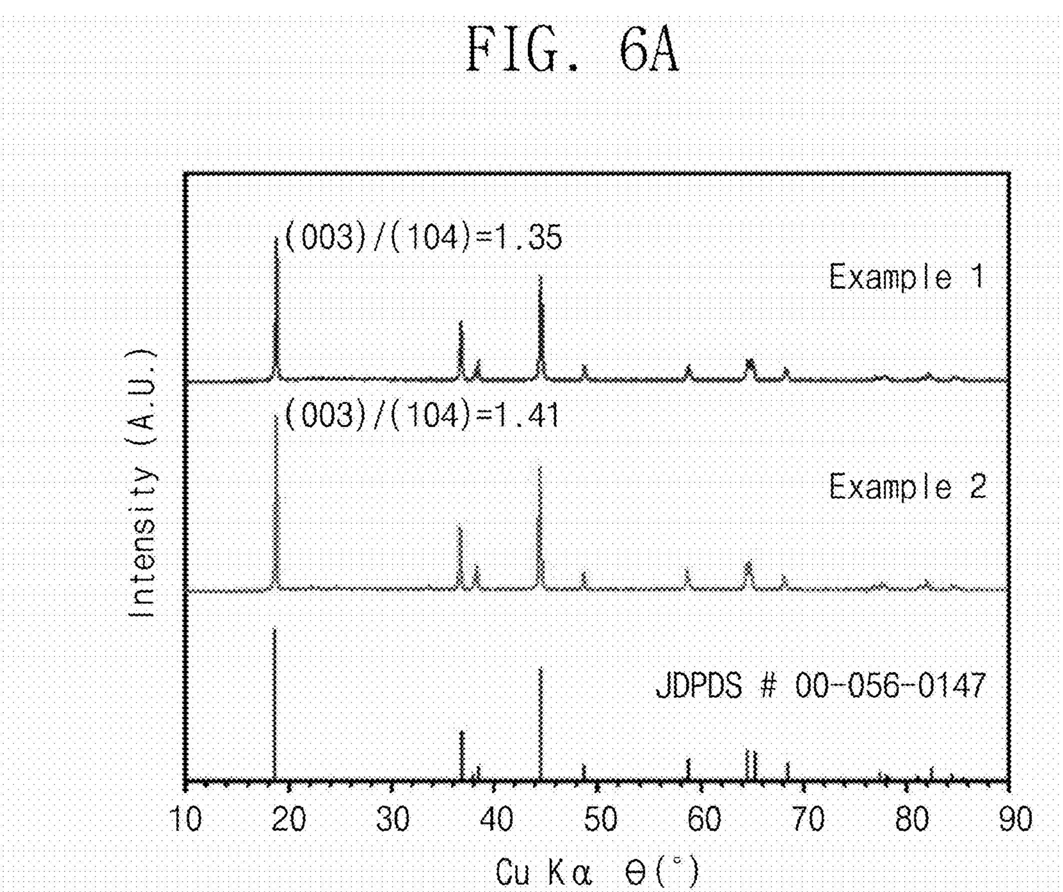
FIG. 6A is a graph showing XRD patterns of NCM particles of Example 1 and NCM particles of Example 2.
Figure 6B:
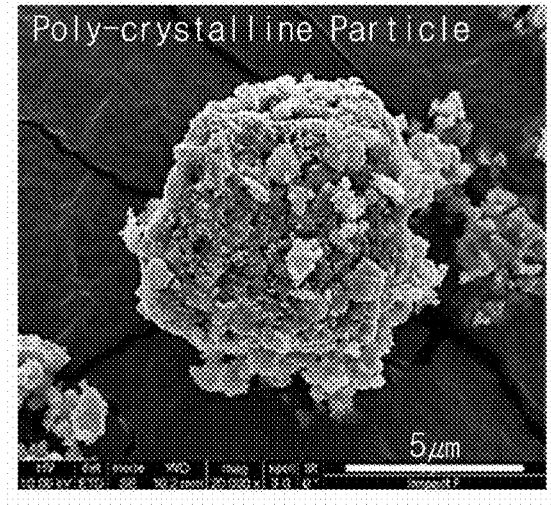
FIG. 6B is an SEM image of NCM particles of Example 1 and NCM particles of Example 2.
Figure 6B:
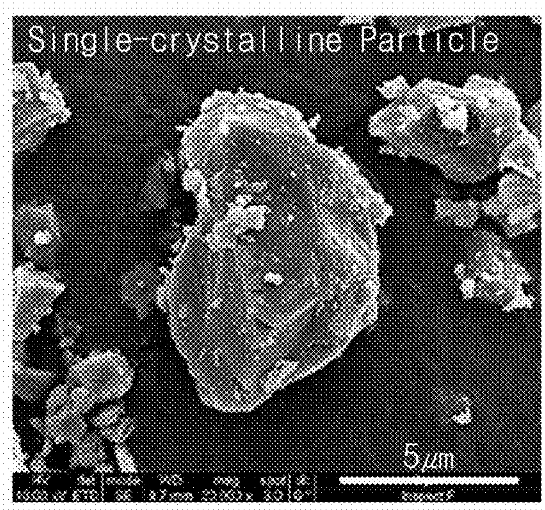

Referring back to FIG. 2, the NCM particles LCO according to embodiments of the inventive concept may have an average diameter of about 5 μm to about 10 μm. the NCM particles LCO may have a polygonal shape with an uneven surface, as shown in FIG. 6B, which will be described later. This is because the NCM particles LCO of an embodiment of the inventive concept were prepared through a solid-state synthetic route. NCM particles prepared through a co-precipitation method may have a circular shape with a smooth surface.

In the NCM particles LCO of an embodiment of the inventive concept, an intensity ratio of (003) to (004) according to XRD analysis may be about 1.3 to about 2.0. This may indicate no cation mixing in the NCM particles LCO as a high-quality active material.

$LiNO_3$-$0.5H_2O$ (Alfa Aesar, USA) as lithium raw material powder, $Ni(NO_3)_2$-$6H_2O$ (Sigma-Aldrich, USA) as nickel raw material powder, $Co(NO_3)_2$-$6H_2O$ (Sigma-Aldrich, USA) as cobalt raw material powder USA), and $Mn(NO_3)_2$-$4H_2O$ (Sigma-Aldrich, USA) as manganese raw material powder were prepared.

Considering loss (evaporation) of lithium upon preparation of the NCM particles according to the present embodiment, the raw material powders were prepared such that a molar ratio of Li:(Ni+Co+Mn) was 1.05:1. The raw material powders were prepared such that a molar ratio of Ni:Co:Mn was 90:5:5.

The prepared raw material powders were mixed with acetone as a solvent to prepare a mixture. The mixture was dried at about 150° C. for about 12 hours to remove $H_2O$ in precursor powder. The dried mixture was put into a tube-type furnace. The mixture was subjected to calcination at about 500° C. for about 6 hours in an oxygen atmosphere to form an NCM precursor.

The calcined NCM precursor was roll-pressed and pelletized at about 15 pi. The pelletized NCM precursor was put back into the tube-type furnace. The NCM precursor was crystallized at about 750° C. for about 12 hours in an oxygen atmosphere to prepare NCM particles (Example 1). Upon the calcination and crystallization, a heating rate of about 5° C./min and an oxygen flow rate of about 3.5 cc/min were maintained. The particles of Example 1 were poly-crystalline lithium composite oxide (LiNiCoMnO) particles.

NCM particles (Example 2) were prepared in the same manner as in Example 1, except that the temperature for crystallization was set to 850° C. The particles of Example 2 were single-crystalline lithium composite oxide (LiNiCoMnO) particles.

Figure 4A:
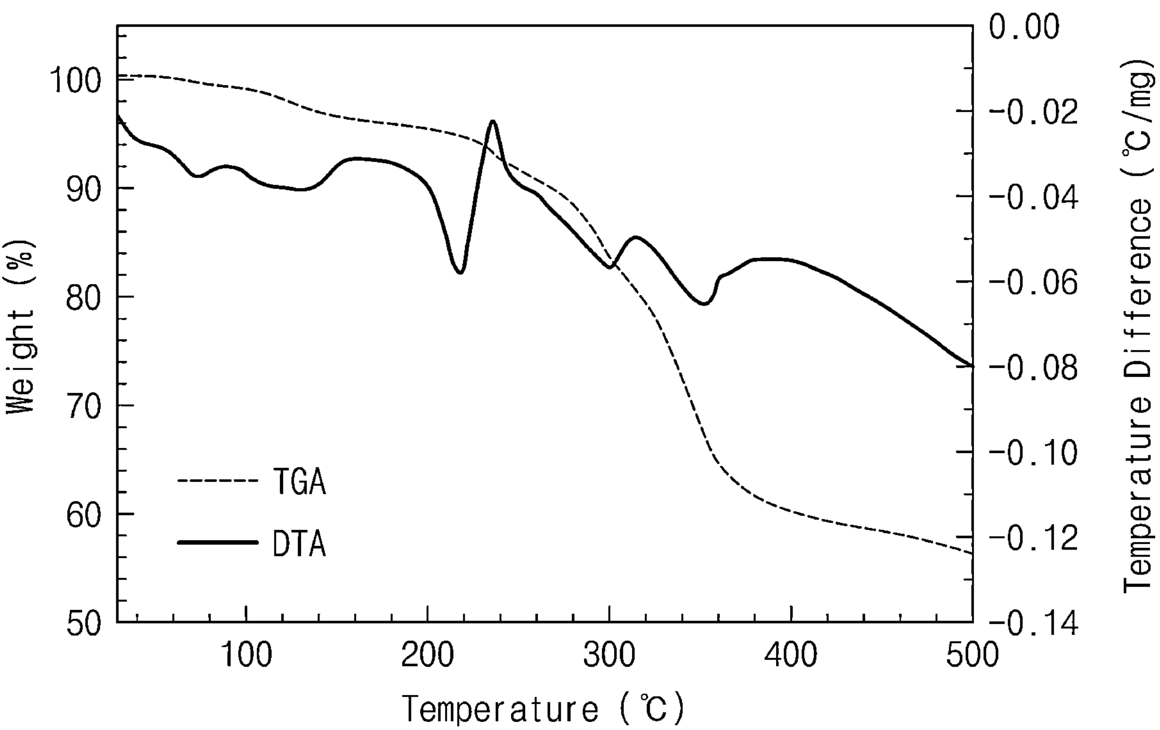
FIG. 4A is a graph showing TG-DTA curves in a step of calcination.
Figure 4B:
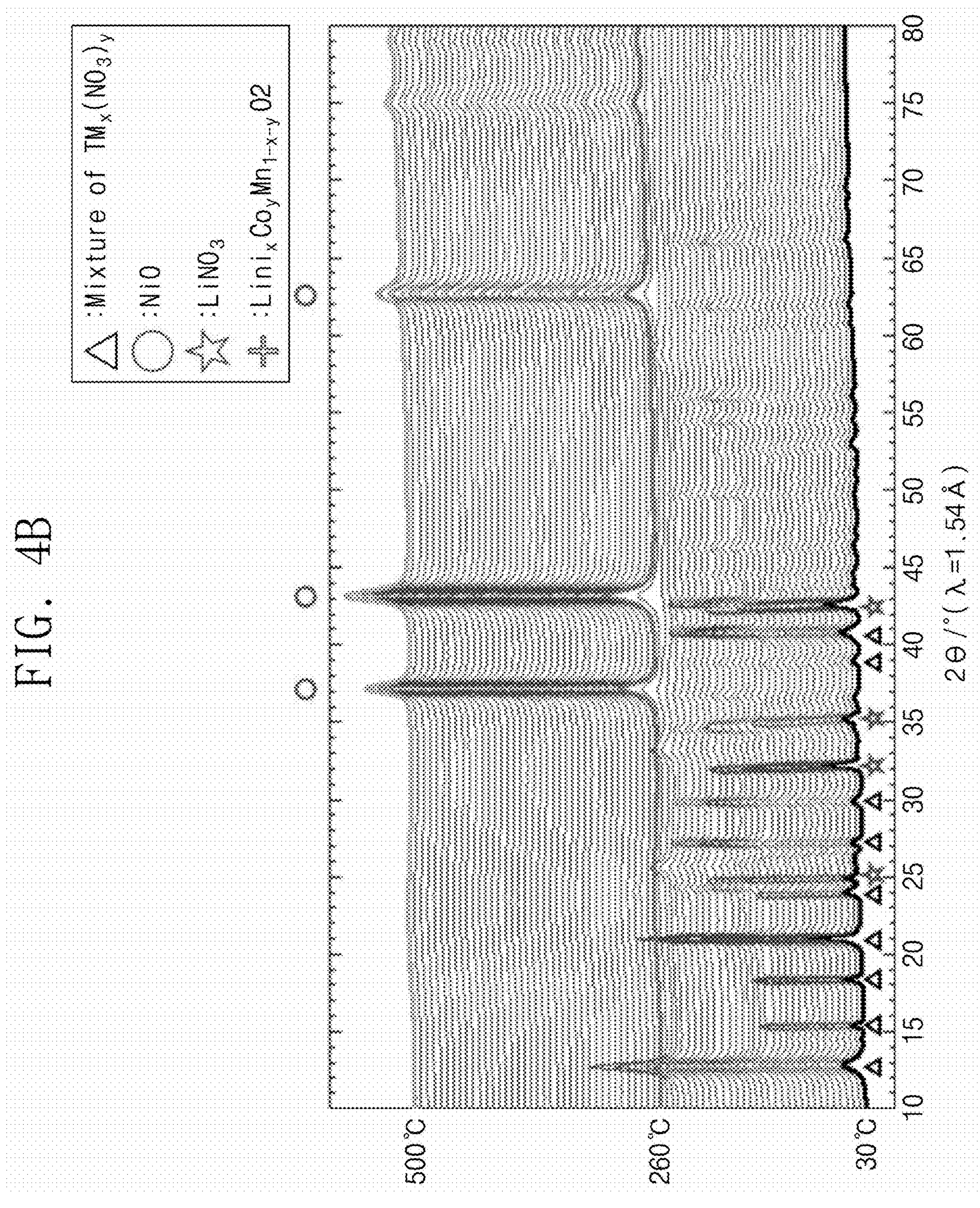
FIG. 4B is a graph showing TR-XRD patterns in a step of calcination.

FIG. 4A is a graph showing TG-DTA curves in a step of calcination. FIG. 4B is a graph showing TR-XRD patterns in a step of calcination.

Referring to FIGS. 4A and 4B, it is determined that the calcination is an endothermic reaction in which mass of a mixture decreases (see FIG. 4A). It is determined that the dried mixture before calcination includes transition metal nitrate ($TMx(NO_3)y$) formed of nickel nitrate, cobalt nitrate, and manganese nitrate, and lithium nitrate ($LiNO_3$). It is determined that decomposition of the transition metal nitrate took place from 200° C. with the rise in calcination temperature. A strong endothermic reaction, which is particularly observed at 210° C., is caused by the decomposition of nickel nitrate. It is determined that the decomposition of the transition metal nitrate is over at 260° C. When the transition metal nitrate is completely decomposed, nickel oxide (NiO), cobalt oxide (CoO), and manganese oxide (MnO) are produced. Thereafter, oxygen and nitrate by-products are removed by up to 500° C.

Figure 4C:
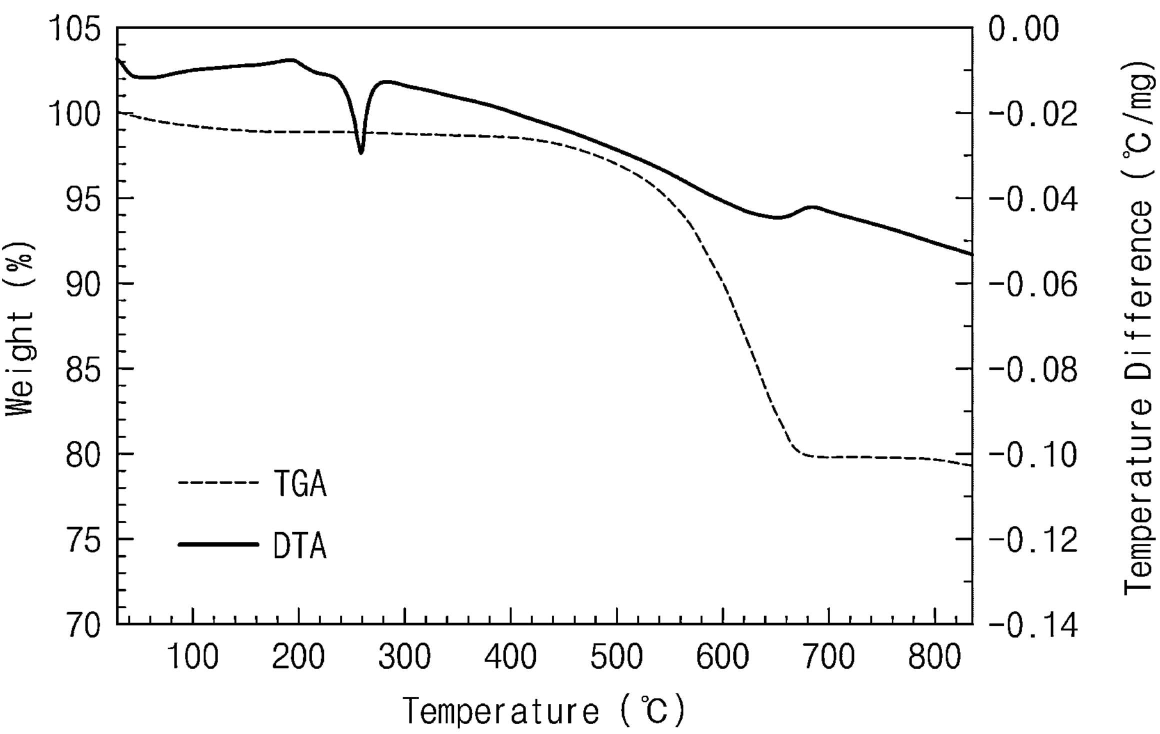
FIG. 4C is a graph showing TG-DTA curves in a step of crystallization.
Figure 4D:
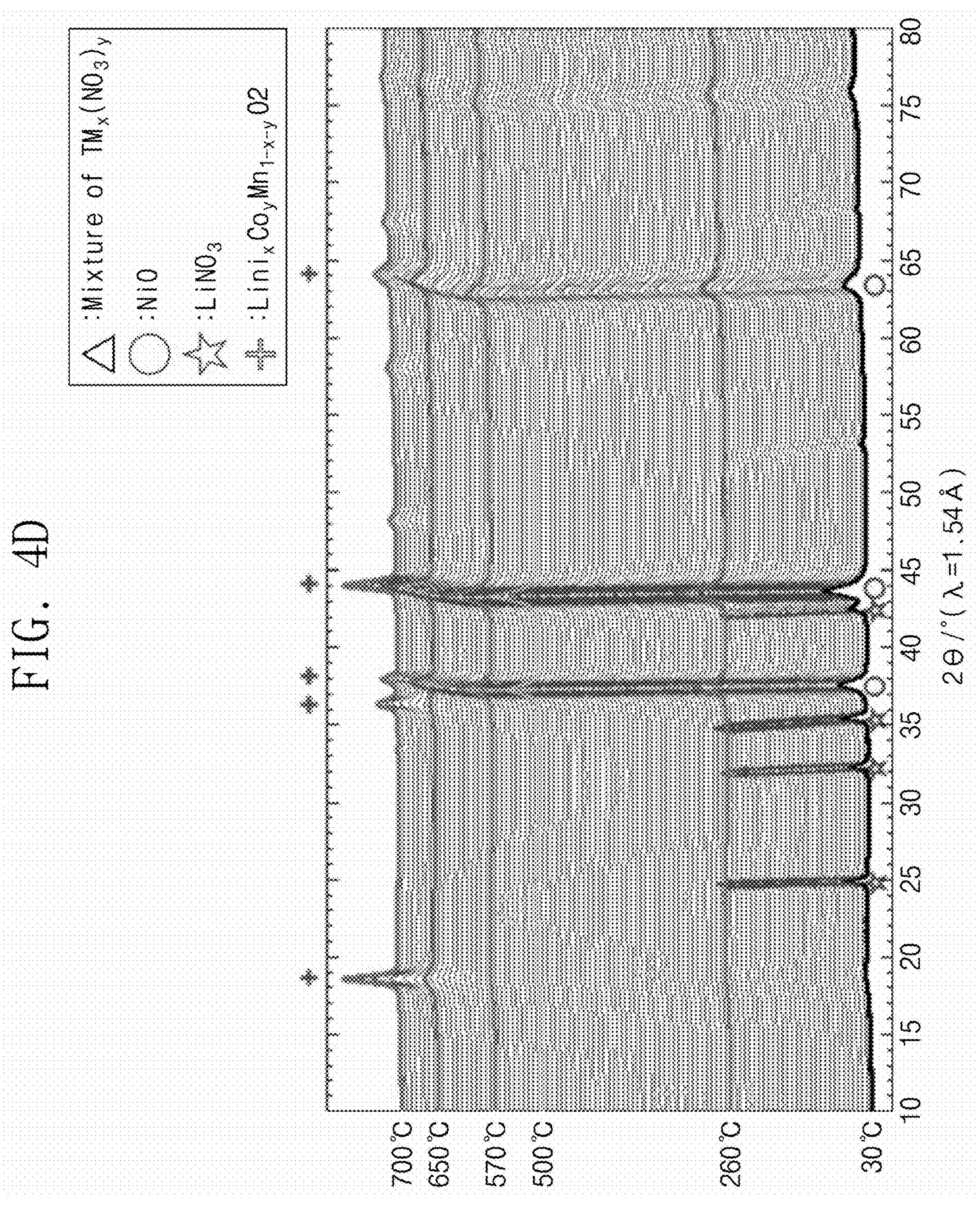
FIG. 4D is a graph showing TR-XRD patterns in a step of crystallization.

FIG. 4C is a graph showing TG-DTA curves in a step of crystallization. FIG. 4D is a graph showing TR-XRD patterns in a step of crystallization.

Referring to FIGS. 4C and 4D, it is determined that the calcined NCM precursor still includes lithium nitrate (red star in FIG. 4D). When the temperature of the crystallization step reaches about 259° C., a strong endothermic reaction takes place. The endothermic reaction is a melting reaction of lithium nitrate.

When the temperature of the crystallization step reaches 570° C., changes in peak of the NCM precursor are observed (FIG. 4D). That is, it is determined that a primary lattice structure of the NCM precursor from transition metal oxide (NiO, CoO, and MnO) begins from 570° C. When the temperature of the crystallization step reaches 650° C., the decomposition reaction causing loss of mass is over. In addition, it is determined that lithium ions ($Li^+$) formed by the decomposition of lithium nitrate are diffused into Li slab between the primary lattices of the NCM precursor. As a result, NCM particles as lithium composite oxide (LiNiCoMnO) are formed from the NCM precursor particles, and the NCM particles have greater crystallinity.

A dried mixture was prepared in the same manner as in Example 1. the mixture was put into a tube-type furnace to perform a heat treatment. Unlike Example 1, in the present Comparative Example, NCM particles (Comparative Example) were prepared through a single heat treatment process at 700° C.

Figure 5:
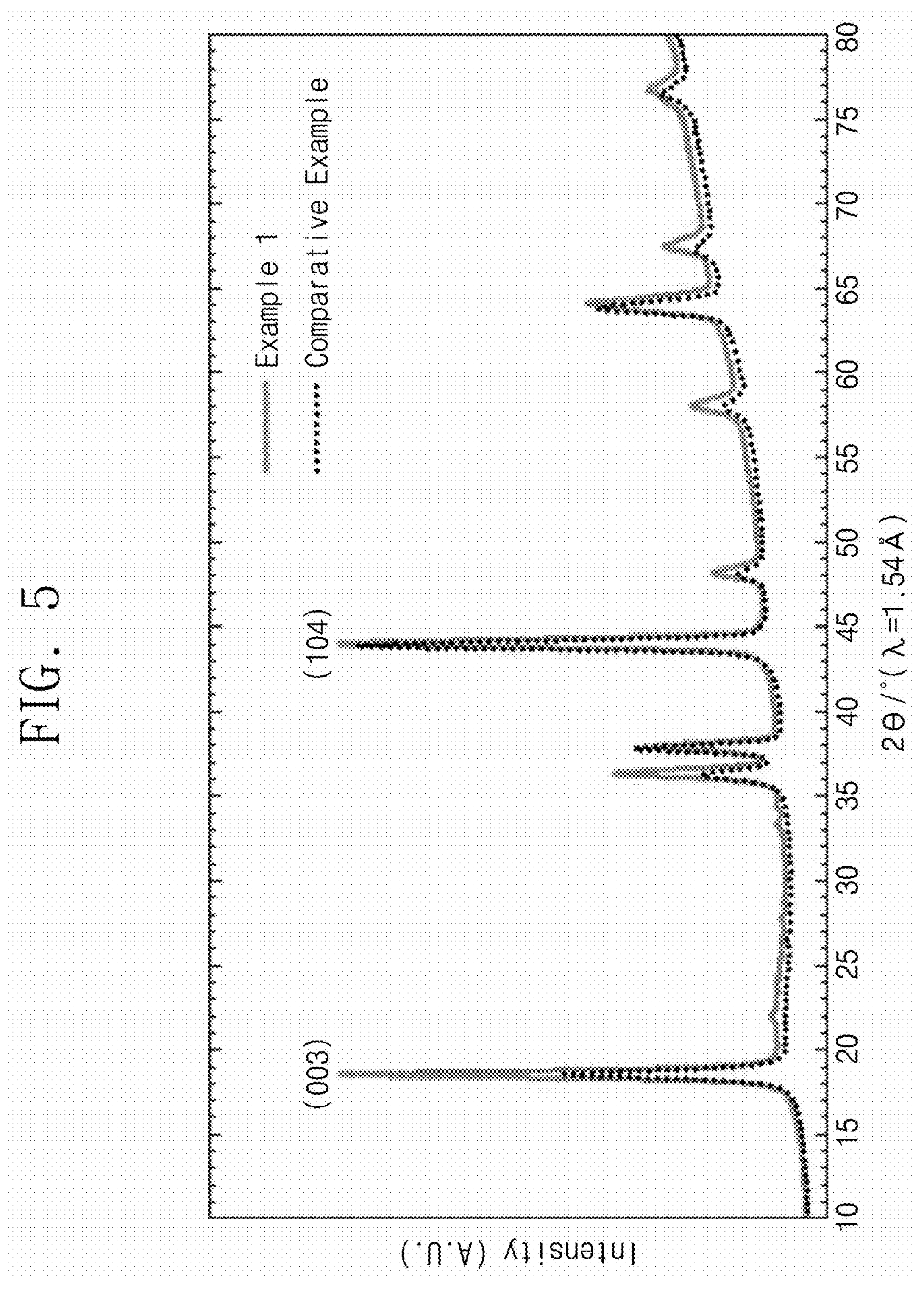
FIG. 5 is a graph showing TR-XRD patterns comparing NCM particles of Example 1 and NCM particles of Comparative Example.

FIG. 5 is a graph showing TR-XRD patterns comparing NCM particles of Example 1 and NCM particles of Comparative Example.

Referring to FIG. 5, it is determined that in the NCM particles of Example 1, an intensity ratio of (003) to (104) is greater than 1.3. However, it is determined that in the NCM particles of Comparative Example, an intensity ratio of (003) to (104) is less than 1.0. That is, in Example 1, the (003) has a greater peak intensity than the (104), but in Comparative Example, the (003) has a smaller peak intensity than the (104).

The intensity ratio of (003) to (104) is a parameter indicating a proportion of cations co-existing in NCM particles. In general, that the intensity ratio of (003) to (104) is greater than 1.2 indicates no co-existing cations. That is, it is determined that NCM particles prepared through a double step of calcination and crystallization according to an embodiment of the inventive concept have no cations co-existing therein. However, it is determined that NCM particles prepared through a single-step of a heat treatment according to Comparative Example have cations co-existing therein as a downside.

The synthetic route of the NCM particles according to the present embodiment may be divided into a step of calcination (first heat treatment) and a step of crystallization (second heat treatment). Diffusion of lithium ions is required to form a layered active material through solid-state synthesis as in an embodiment of the inventive concept. In the solid-state synthesis, lithium ions are diffused through mass transport between rigid lattices.

Meanwhile, volatile substances generated by decomposition of transition metal nitrate in the first heat treatment process form voids in the NCM precursor. When the NCM particles are synthesized through a single heat treatment process as in Comparative Example described above, voids formed in the NCM precursor prevents the diffusion of lithium ions. In addition, nickel ions similar in size to lithium ions occupy Li sites to cause cation mixing.

However, according to embodiments of the inventive concept, transition metal nitrate is first decomposed through the first heat treatment (calcination process) to form an NCM precursor, and the NCM precursor is pelletized and compressed to perform the second heat treatment (crystallization process). As the NCM precursor is pelletized and compressed, the above-described pores may all be removed, and accordingly, lithium ions may be diffused well upon the second heat treatment to form NCM particles of lithium composite oxide (LiNiCoMnO).

FIG. 6A is a graph showing XRD patterns of NCM particles of Example 1 and NCM particles of Example 2. FIG. 6B is an SEM image of NCM particles of Example 1 and NCM particles of Example 2.

Referring to FIG. 6A, it is determined that Examples 1 and 2 have a hexagonal NCM structure having an R-3m space group with no other impurities. Diffraction patterns of Examples 1 and 2 were compared with those of $LiNi_{1/3}Co_{1/3}Mn_{1/3}O_2$ in ICDD database (JCPDS #00-056-0147). Each diffraction pattern of Example 1 and Example 2 was consistent with the reference diffraction pattern. In Example 1, a ratio of (003) to (104) was 1.35, and in Example 2, a ratio of (003) to (104) was 1.41. That is, it is determined that cation mixing does not take place in an active material according to an embodiment of the inventive concept.

Referring to FIG. 6B, it is determined that both the particles of Example 1 and the particles of Example 2 have a diameter of about 7 μm. However, the crystallization morphology of the particles of Example 1 is different from that of the particles of Example 2. That is, crystallization temperature in the crystallization step had a huge role in the morphology of NCM particles. For example, the particles of Example 1 were formed at a crystallization temperature of about 750° C., and the particles of Example 2 were formed at a crystallization temperature of about 850° C. Accordingly, the particles of Example 1 and the particles of Example 2 turned out to have different shapes.

Specifically, when the crystallization temperature is maintained at a relatively low level, primary particles are formed and the primary particles are aggregated to form poly-crystalline secondary particles. The poly-crystalline secondary particles may have a quasi-spherical shape having a relatively small surface area (Example 1). On the other hand, when the crystallization temperature is maintained at a relatively high level, primary particles may grow from nuclei into particles without clear grain boundaries. That is, the particles of Example 1 may be poly-crystalline particles formed through aggregation of primary particles, and the particles of Example 2 may be single-crystalline particles formed of grown primary particles.

Inductively coupled plasma optical emission spectroscopy (ICP-OES) was performed on the NCM particles of Example 1 and the NCM particles of Example 2 to analyze chemical compositions thereof. The results thereof are presented in Table 1 below. Ni, Co, and Mn were analyzed, and the unit is at %.

TABLE 1

| | Example 1 | Example 2 |
|---|---|---|
| Ni | 0.8921 | 0.8921 |
| Co | 0.0546 | 0.0545 |
| Mn | 0.0533 | 0.0534 |

Ni, Co, and Mn in both Examples 1 and 2 were measured to be in an amount of 89.2 at %, 5.5 at %, and 5.3 at %, respectively. That is, it is determined that the NCM particles of Examples 1 and 2 contain a high amount of Ni.

Figures 7, 8:
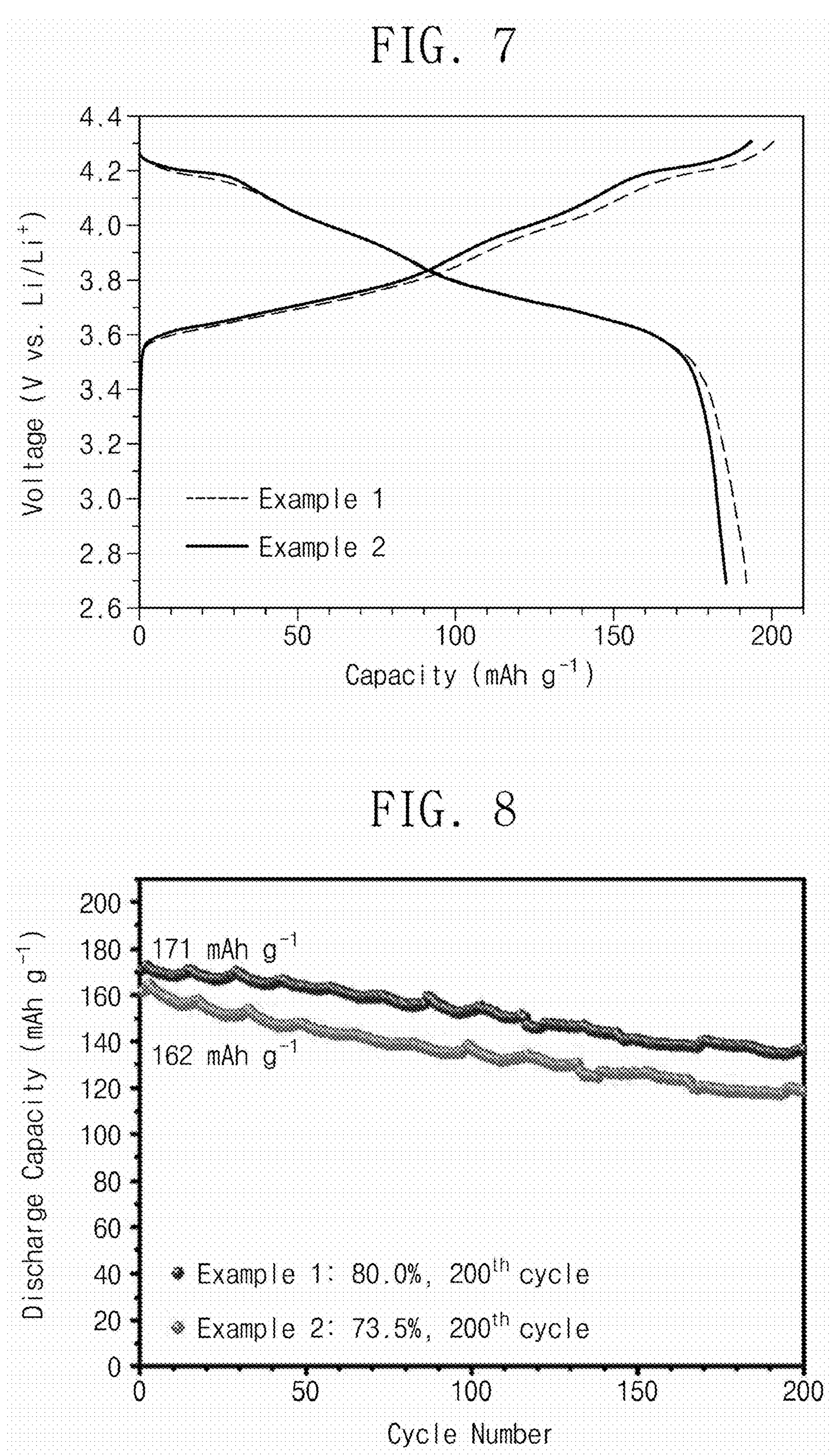
FIG. 7 is a graph showing a voltage profile of a first cycle in lithium secondary batteries using NCM particles of Example 1 and NCM particles of Example 2.
FIG. 8 is a graph showing cycle performance in lithium secondary batteries using NCM particles of Example 1 and NCM particles of Example 2.

FIG. 7 is a graph showing voltage profile of a first cycle in lithium secondary batteries using NCM particles of Example 1 and NCM particles of Example 2.

Batteries using the NCM particles of Examples 1 and 2 were prepared, and charged/discharged at a current rate of 0.1 C. Examples 1 and 2 both showed satisfactory voltage profiles and satisfactory discharge capacities.

Examples 1 and 2 showed similar initial voltage profiles upon a first charge/discharge cycle. However, the discharge capacity of Example 1 and the discharge capacity of Example 2 were different. The single-crystalline NCM particles of Example 2 showed a discharge capacity of 185 mAh/g, but the poly-crystalline NCM particles of Example 1 showed a higher discharge capacity of 192 mAh/g. The single-crystalline NCM particles may morphologically cause slow movement of materials inside the particles. Therefore, it is determined that the single-crystalline NCM particles showed a lower discharge capacity than the poly-crystalline NCM particles.

FIG. 8 is a graph showing cycle performance in lithium secondary batteries using NCM particles of Example 1 and NCM particles of Example 2.

Referring to FIG. 8, cycle performance at 1 C was measured for Examples 1 and 2 upon 200 cycles. This experiment was performed as a half-cell test at a current rate of 1 C and a voltage range of 2.7 V to 4.3 V.

As shown in FIG. 8, the NCM particles of Example 1 showed a capacity retention of 80.0% after 200 cycles. The NCM particles of Example 2 showed a capacity retention of 73.5% after 200 cycles. Examples 1 and 2 showed the same level of discharge capacity and capacity retention as NCM particles containing a high amount of nickel prepared through a typical co-precipitation method. Furthermore, it is determined that the poly-crystalline NCM particles according to an embodiment of the inventive concept (Example 1) have greater battery durability than the single-crystalline NCM particles (Example 2).

A cathode active material for a lithium secondary battery according to an embodiment of the inventive concept may include poly-crystalline or single-crystalline lithium composite oxide particles containing a high amount of nickel. An active material of an embodiment of the inventive concept may have high energy density through a high amount of nickel and excellent durability in shape. An active material of an embodiment of the inventive concept is prepared through a one-pot solid-state synthetic route, and processes may thus be simple and economical.

What is claimed is:

1. A method for preparing a cathode active material for a lithium secondary battery, the method comprising:

mixing lithium nitrate, nickel nitrate, cobalt nitrate, and manganese nitrate with a solvent to form a mixture;

performing a first heat treatment on the mixture to form an NCM precursor, the NCM precursor including the lithium nitrate and transition metal oxide (NiCoMnO);

compressing the NCM precursor to remove voids; and performing a second heat treatment on the NCM precursor to form NCM particles, wherein the NCM particles include lithium composite oxide (LiNiCoMnO), wherein the NCM particles are polycrystalline particles formed by aggregation of primary particles, wherein the solvent is ketone, wherein the first heat treatment is performed at about 350° C. to about 600° C., and wherein the second heat treatment is performed at about 570° C. to about 800° C.

2. The method of claim 1, wherein an intensity ratio of (003) to (104) according to XRD analysis of the NCM particles is about 1.3 to about 2.0.

3. The method of claim 1, wherein each of the first heat treatment and the second heat treatment is performed at a heating rate of about 3° C./min to about 10° C./min.

4. The method of claim 1, further comprising pelletizing the compressed NCM precursor.

5. The method of claim 1, wherein during the second heat treatment, lithium ions generated through decomposition of the lithium nitrate are diffused into and bonded with the transition metal oxide.

6. The method of claim 1, wherein an atomic fraction of nickel (Ni) to nickel (Ni), cobalt (Co), and manganese (Mn) in the NCM particles is about 85 at % to about 95 at %.

7. The method of claim 1, wherein the NCM particles have an average diameter of about 5 μm to about 10 μm.

8. The method of claim 1, wherein the voids are generated through the first heat treatment process, and the NCM precursor are compressed to remove the voids.

9. The method of claim 8, further comprising:

drying the mixture to remove $H_2O$; and collecting the dried mixture as a powder mixture.

10. A method for controlling the morphology of a cathode active material for a lithium secondary battery, the method comprising:

mixing lithium nitrate, nickel nitrate, cobalt nitrate, and manganese nitrate with a solvent to form a mixture;

performing first heat treatment on the mixture to form an NCM precursor, the NCM precursor including the lithium nitrate and transition metal oxide (NiCoMnO);

compressing the NCM precursor to remove voids; and performing second heat treatment on the NCM precursor to form NCM particles, wherein the NCM particles include lithium composite oxide (LiNiCoMnO), wherein the NCM particles are polycrystalline particles formed by aggregation of primary particles, wherein the solvent is ketone, wherein the first heat treatment is performed at about 350° C. to about 600° C., and wherein the second heat treatment is performed at about 570° C. to about 800° C., wherein the temperature of the second heat treatment is regulated to control the morphology and crystallinity of the NCM particles.

* * * * *